(12) United States Patent
Martin et al.

(10) Patent No.: US 7,102,500 B2
(45) Date of Patent: Sep. 5, 2006

(54) SYSTEM AND METHOD FOR INDICATING A TURN BY A VEHICLE

(75) Inventors: John R. Martin, Rockford, IL (US); Thomas P. Myers, Machesney Park, IL (US)

(73) Assignee: Arachnid, Inc., Rockford, IL (US)

( * ) Notice: Subject to any disclaimer, the term of this patent is extended or adjusted under 35 U.S.C. 154(b) by 31 days.

(21) Appl. No.: 10/861,165

(22) Filed: Jun. 4, 2004

(65) Prior Publication Data

US 2004/0246119 A1 Dec. 9, 2004

Related U.S. Application Data

(60) Provisional application No. 60/476,023, filed on Jun. 5, 2003, provisional application No. 60/486,092, filed on Jul. 10, 2003.

(51) Int. Cl.
*B60Q 1/40* (2006.01)

(52) U.S. Cl. ............... 340/477; 340/475; 340/476; 200/61.3; 200/61.31

(58) Field of Classification Search ............ 340/477, 340/476
See application file for complete search history.

(56) References Cited

U.S. PATENT DOCUMENTS

| | | | | |
|---|---|---|---|---|
| 4,030,066 A | * | 6/1977 | White ............... | 340/476 |
| 4,333,071 A | * | 6/1982 | Kira et al. ........... | 340/477 |
| 4,660,020 A | * | 4/1987 | Miyamaru et al. ..... | 340/477 |
| 6,204,759 B1 | * | 3/2001 | Jahnke .............. | 340/476 |

OTHER PUBLICATIONS http://www.shouldexist.org/story/2001/7/17/17438/1503 "Idiot-proof turn signals".

* cited by examiner

*Primary Examiner*—Donnie L. Crosland
(74) *Attorney, Agent, or Firm*—McAndrews, Held & Malloy

(57) ABSTRACT

A system for automatically deactivating a turn signal displayed on a vehicle, the system including a sensor configured to measure a vehicle turn attribute, and a processing unit in communication with the sensor, wherein the processing unit deactivates the turn signal based on a comparison between the vehicle turn attribute and a predetermined data point referenced by the processing unit.

29 Claims, 2 Drawing Sheets

SYSTEM AND METHOD FOR INDICATING A TURN BY A VEHICLE

RELATED APPLICATIONS

This application relates to and claims priority benefits of U.S. Provisional Application No. 60/476,023, entitled "Improved Turn Signal," which was filed Jun. 5, 2003, and U.S. Provisional Application No. 60/486,092, also entitled "Improved Turn Signal," which was filed Jul. 10, 2003. Both of these applications are hereby incorporated by reference in their entireties.

BACKGROUND OF THE INVENTION

Certain embodiments of the present invention generally relate to a system and method of indicating a turn by a vehicle, and more particularly to an improved turn signal that is automatically deactivated.

Various vehicles, such as automobiles, use turn signals to indicate an operator's desire to turn the vehicle. Signaling a turn allows one driver to notify other drivers that he/she is about to either change lanes, or make a turn onto another street, off-ramp, parking-lot, drive way, or the like.

Typically, once a full turn is completed, a turn signal activator is deactivated through a mechanical trigger or reset apparatus. For example, in automobiles, when the wheels are straightened after a turn, the mechanical motion of the steering wheel itself is used to cancel the operation of the directional signal.

Various vehicles with a single steerable front wheel, such as motorcycles, may not include a system for an automatic mechanical deactivation of a turn signal. Consequently, operators of these vehicles typically need to manually deactivate the turn signal. Often, an operator forgets to deactivate the turn signal, thereby erroneously notifying other drivers of an impending turn.

Thus, a need exists for an improved system and method of automatically deactivating a turn signal. Further, a need exists for such a system and method that does not rely on a mechanical trigger to deactivate the turn signal.

BRIEF SUMMARY OF THE INVENTION

An embodiment of the present invention provides a system for automatically deactivating a turn signal displayed on a vehicle. The system includes one or more sensors configured to measure vehicle attributes or variables (which may be a vehicle speed, position, time of turn, vehicle acceleration, or turn distance) and a processing unit in communication with the sensor. The processing unit deactivates the turn signal based on a comparison between the vehicle turn attribute and a predetermined data point referenced by the processing unit. The predetermined data point may be permanently or temporarily stored in a memory of the processing unit, or a remote memory in communication with the processing unit. The sensor may be a velocity measuring device, a timer, an accelerometer, a distance measuring device, or any combination thereof.

Certain embodiments of the present invention provide a system for automatically deactivating a turn signal displayed on a vehicle. The system includes a steering device for steering the vehicle, a turn signal activator configured to be engaged to activate a turn signal, a turn attribute sensing device including at least one of a velocity sensor configured to detect a velocity of the vehicle, a distance measuring device configured to measure a distance traveled by the vehicle, and a timer. A processing unit is in communication with the turn attribute sensing device. The processing unit deactivates the turn signal based on a comparison between a predetermined data point and the vehicle turn attribute. Additionally, certain embodiments of the present invention may utilize global positioning systems (GPS) to determine a turn of a vehicle by comparing the position (e.g., heading) of a vehicle at different times.

Another embodiment of the present invention provides a method of automatically deactivating a turn signal displayed on a vehicle. The method includes activating a turn signal, sensing a vehicle turn attribute, comparing the vehicle turn attribute to a predetermined data point related to the vehicle turn attribute such that the vehicle turn attribute and the predetermined data point are measured in the same units (e.g., both the vehicle turn attribute and the predetermined data point are measured velocities), and deactivating the turn signal based on the comparison.

Another embodiment of the present invention provides a method wherein the vehicle attribute is a vehicle heading, and the predetermined data point is representative of a change of direction from a first heading to a second heading, which may be 90 degrees different from the first heading (e.g., North may be the first heading, while West may be the second heading). The deactivation of the turn signal occurs when the vehicle heading changes from the first heading to the second heading. In general, a full turn may be determined by a heading change of 90 degrees. Optionally, the method may determine a full turn as a change of heading that is more or less than 90 degrees.

Figure 1:
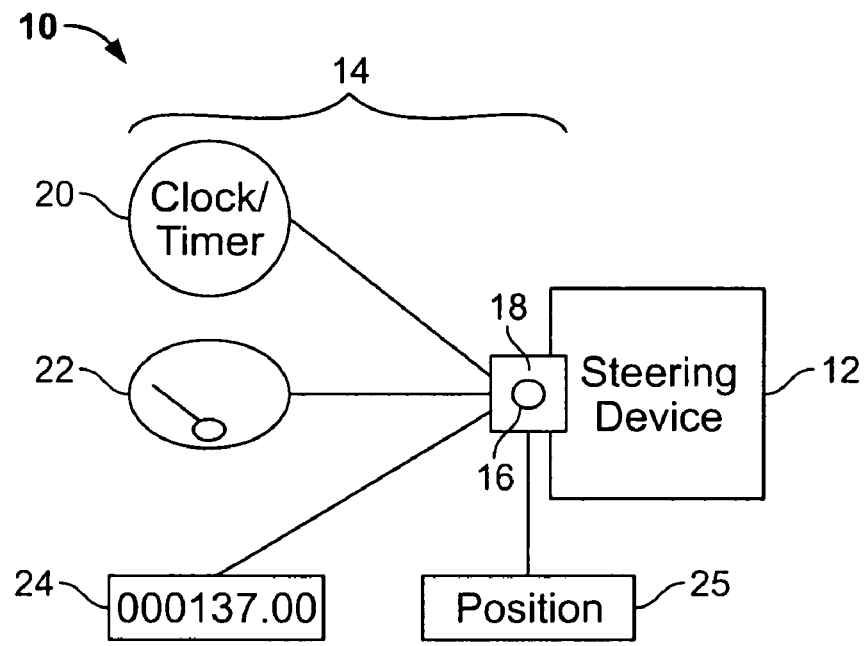
FIG. 1 illustrates a schematic diagram of a turning system for a vehicle according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a schematic diagram of a turning system 10 for a vehicle according to an embodiment of the present invention. The system 10 may be used with various types of vehicles, in which turn signals are indicated, including automobiles, motorcycles, bicycles, aircraft (e.g., turn signals may be used while aircraft are taxied on to runways, etc.), and the like.

Figure 2:
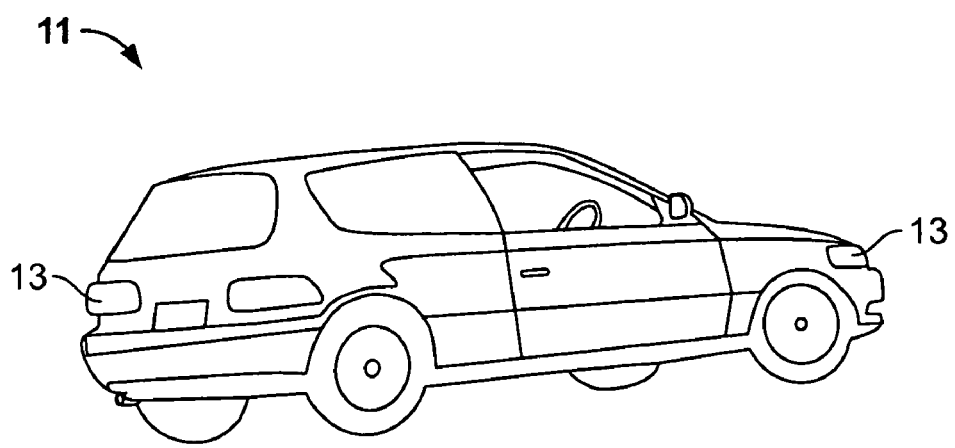
FIG. 2 illustrates an isometric view of a vehicle.

FIG. 2 illustrates an isometric view of a vehicle 11. As shown in FIG. 2, the vehicle 11 may be an automobile having turn signal indicators 13, such as directional lights, at front and rear ends of the vehicle 11. While the vehicle 11 is shown as an automobile, embodiments of the present invention may be used with various other types of vehicles, as noted above.

Referring again to FIG. 1, the turning system 10 includes a steering device 12 that is used to steer the vehicle, and a turn signal activation system 14. The steering device 12 may be a steering wheel, a handle, lever, joystick, button(s), foot pedals, stick, or the like.

The turn signal activation system 14 includes a turn signal activator 16 in communication with a processing unit 18, which may be a microchip or other such processor. The turn signal activator 16 may be a button, lever, stick, or any other such device that may be engaged in order to activate the turn signal (i.e., allows a signal to be sent to the processing unit 18). The turn signal activation system 14 also includes a clock/timer 20, a velocity sensing device 22, such as used in conjunction with a speedometer, a distance measuring device 24, such as used in conjunction with an odometer that is configured to measure the distance the vehicle travels, and a positional sensor 25, which may be a gyroscope or another device that may be in communication with a global positioning system (GPS).

The velocity sensing device 22 may measure the velocity of the vehicle by measuring the rate of rotation of a wheel, while the distance measuring device may correlate distance traveled to the number of rotations of the wheel. The velocity sensing device 22 may also sense velocity of the vehicle based on revolutions per minute (RPMs) within the engine of the vehicle, which are typically indicated by a tachometer. The timer 20, the velocity sensing device 22, the distance measuring device 24, and the positional sensor 25 are all in communication with the processing unit 18, either through wires, or through wireless connections. The processing unit 18 detects elapsed time signals from the timer 20, velocity signals from the velocity sensing device 22, signals indicative of distance traveled from the distance measuring device 24, and positional signals (e.g., heading of the vehicle) from the positional sensor 25.

Additionally, the turn signal activation system 14 may include an accelerometer in communication with the processing unit 18, such that the processing unit receives signals representative of vehicle acceleration from the accelerometer. Optionally, the turn signal activation system 14 may include less than all of the timer 20, the velocity sensing device 22, the distance measuring device 24, and the accelerometer. For example, the turn signal activation system 14 may include only the timer 20, the velocity sensing device 22, the distance measuring device 24, the positional sensor 25, or the accelerometer, or any combination thereof.

Certain embodiments of the present invention use the measured velocity of a vehicle to determine when to deactivate a turn direction indicator. In operation, the processing unit 18 determines the velocity of the vehicle by way of the velocity sensing device 22. Once the operator of the vehicle activates the turn direction indicator to display a turn signal (such as by a flashing light on a turn signal indicator) by engaging the turn signal activator 16, a signal is sent from the turn signal activator 16 to the processing unit 18. The processing unit 18 then activates the turn signal indicator(s) (such as the turn signal indicator 13 shown in FIG. 2) of the vehicle to display a turn signal. Additionally, the processing unit 18 temporarily stores, in memory, a data point representing the magnitude of the velocity, i.e., speed, of the vehicle at the moment the turn signal activator 16 is engaged, or at a time just prior to the engagement of the turn signal activator 16. The processing unit 18 compares the velocity of the vehicle through the turn with the stored velocity data.

As the vehicle turns, the velocity of the vehicle changes by virtue of the turn itself. Typically, as a vehicle turns, the magnitude of its velocity, i.e., speed, decreases. The processing unit 18 continues to monitor the velocity of the vehicle through the velocity sensing device 22 during the turn. The processing unit 18 deactivates the turn signal indicator(s) of the vehicle after the magnitude of the velocity reaches a predetermined fraction or percentage of the stored velocity data point. For example, the processing unit 18 may deactivate the turn signal indicator(s) once the speed of the vehicle is within 80% of the stored velocity data point. Optionally, various other predetermined percentages may be used by the processing unit 18 to trigger deactivation of the turn signal indicator(s).

In another embodiment of the present invention, the central processing unit 18 computes a predetermined "minimum" speed of the vehicle once the turn signal activator 16 is engaged. For example, once the turn signal activator 16 is engaged, the processing unit 18 stores a speed data point that is a fraction or percentage, for example 80%, of the instantaneous speed of the vehicle at the moment the turn signal activator 16 is engaged. The processing unit 18 continues to monitor the velocity of the vehicle through the turn. After the speed of the vehicle drops below the predetermined minimum speed represented by the stored speed data point, and subsequently rises above the stored speed data point, the processing unit 18 deactivates the turn signal displayed on the turn signal indicator(s).

In still another embodiment of the present invention, a turning distance data point is stored within the memory of the processing unit 18. The turning distance data point may be a measure of distance traveled by a vehicle that equals the distance of a "normal" turn. For example, a normal turn from a vehicle heading in a North direction to a West direction may be a certain number of feet or meters of distance (or number of revolutions of a wheel), which is detected by the distance measuring device 24. Once the turn signal activator 16 is engaged, the processing unit 18 detects the distance traveled by the vehicle through the distance measuring device 24. When the distance traveled by the vehicle matches or exceeds the turning distance data point, the processing unit 18 deactivates the turn signal displayed on the turn signal indicator(s).

In yet another embodiment of the present invention, a turning time data point is stored within the memory of the processing unit 18. The turning time data point may be a measure of time a vehicle typically takes to make a normal turn. For example, a normal turn from a vehicle heading in a North direction to a West direction may take a certain number of seconds. Once the turn signal activator 16 is engaged, the processing unit 18 detects the actual turn time of the vehicle through the timer 20. When the actual turn time of the vehicle matches or exceeds the turning time data point, the processing unit 18 deactivates the turn signal displayed on the turn signal indicator(s).

The central processing unit 18 may use data collected from each of the timer 20, the velocity measuring device 22, the distance measuring device 24, the positional sensor 25, or accelerometer, alone, or in combination with one another to determine when to deactivate a turn signal. Additionally, in the event that the vehicle comes to a complete stop after the turn signal activator 16 is engaged, the processing unit 18 continues to maintain displaying the turn signal. Optionally, the turn signal sequence may be interrupted while the vehicle is stopped, and resumed upon movement of the vehicle.

The processing unit 18 may be in communication with the positional sensor 25, which in turn may be communication with a satellite of a global positioning system (GPS). Turning directions, speed, and the like may be determined through the positional sensor 25 and/or the GPS. That is, the processing unit 18 may receive heading signals (e.g., North or South) from the positional sensor and/or the GPS. The processing unit 18 may then determine when a turn is complete through these signals. For example, the processing unit 18 may determine that the vehicle has made a complete turn based on orientation data, e.g., directional heading, received from the positional sensor 25, which may be a compass, gyroscope or the like. The processing unit 18 may be configured to determine that a turn has been completed when the heading of the vehicle is 90 degrees different from an initial heading. The initial heading may be stored in memory as an data point when the turn signal is first activated. The processing unit 18 then compares the heading of the vehicle to the initial heading. When the heading of the vehicle is 90 degrees different from the initial heading, the processing unit 18 deactivates the turn signal. Optionally, the central processing unit 18 may be configured to determine the completion of a turn when an initial heading differs from a later heading by more or less than 90 degrees.

Additionally, the positional sensor 25 may transmit a signal to a GPS, which may then transmit a positional signal back to the central processing unit 18 indicating the vehicle's position, heading and/or speed. The central processing unit 18 may then use this information to determine when a turn is complete. For example, the central processing unit 18 may determine that a full turn is complete through data received from the GPS indicating that the heading of the vehicle has changed from one direction, e.g., North, to a second direction, e.g., West.

Additionally, the processing unit 18 may be configured to distinguish between a regular turn, and a "lane change", or "lesser" turn, which is not a full turn. For example, if a vehicle operator wishes to make a full turn, the user engages the turn signal activator 16 for a predetermined time indicative of a full turn, which is detected by the processing unit 18. If, however, the operator merely wants to signal a lane change, the operator engages the turn signal activator for another predetermined time indicative of a lesser turn. For example, the user may engage the turn signal activator 16 for three seconds to initiate the signaling of a full turn, while the turn signal activator 16 may be engaged for one second to initiate signaling of a lesser turn. Further, the turn signal activation system 14 may include separate turn signal activators for full and lesser turns. For example, the system 10 may include a partial activation switch configured for a lane change signal. The processing unit 18 may deactivate a signal for a lesser turn after a predetermined time or distance, due to the fact that the speed of the vehicle may not change appreciably during the lesser turn.

Figure 3:
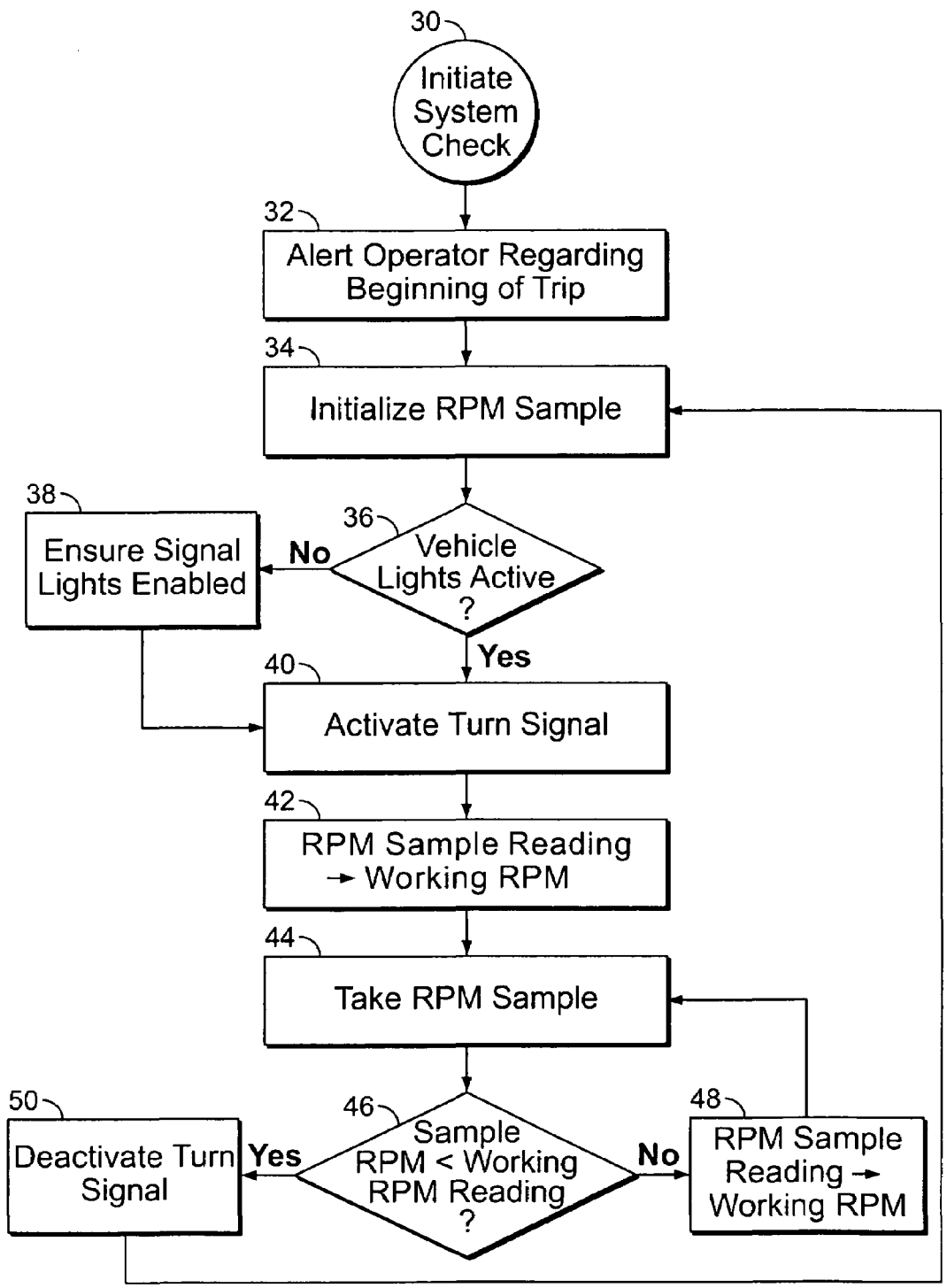
FIG. 3 illustrates a flow chart of a method of deactivating a turn signal according to an embodiment of the present invention.

FIG. 3 illustrates a flow chart of a method of deactivating a turn signal according to an embodiment of the present invention. At 30, the vehicle, such as a motorcycle, is turned on, such as through the ignition of an engine. Initially, the operator may choose to enter a test/calibration mode, in which the sensors, such as velocity and distance sensors, are calibrated according to a known quantity, such as a mile, kilometer, or the like. The system shown in FIG. 1 may also include a separate calibration switch that may be engaged to start measurement of a distance, such as a mile, and the end of that distance, thereby calibrating the system to that distance.

At 32, an alert, such as a beeping or buzzing noise, or a message on a display, informs the operator of the vehicle that a new trip is beginning, thereby reminding the operator to reset the trip odometer, if he/she chooses, and/or to begin recording mileage from that point. An RPM sample is taken at 34. This is done to initialize the RPM counter to clear out any previous sampled values and to set the RPM counter to a starting value. The processor of the turn activation system may record RPM samples at various times during operation of the vehicle, or when the turn signal activator is engaged, as discussed above.

Additionally, the operator may calibrate a full turn engagement of the activator and a lesser turn. That is, the user may set the time for a full turn by engaging the turn signal activator for a first period of time; and he/she may also set the time for a lesser turn, such as a lane change, by engaging the turn signal activator for a second period of time. Setting or calibrating the turn signal activator may be initiated by the operator engaging the activator an amount of time programmed into the processor. For example, the processor may be adapted to recognize that engagement of the activator for 7 seconds initiates a full turn set-up process, while an engagement of the activator for 10 seconds initiates a lesser turn set-up process. Optionally, the set-up process may be initiated by the operator repeatedly switching the activator ON and OFF for a predetermined period of time and/or by a specific sequence of events, such as by first switching the activator ON, then turning the lights on, and the like.

Referring again to FIG. 3, the processor checks to make sure that all vehicle lights/indicators, including turn signal lights, are active at 36. If the lights/indicators are not active, the processor ensures that they are enabled at 38.

At 40, an operator activates a turn signal. At this point, the RPM sample reading from 34 will be greater or equal to the actual working RPM of the vehicle during a turn at 42. At 44, the processor takes another RPM sample during a turn. As discussed above, a vehicle's speed during a turn is typically slower than at a time just before the vehicle turns. If, at 46, the sample RPM is less than the working RPM, then the processor continues to check to see at which point the sample RPM is greater to or equal to the working RPM of the vehicle at 48 and continues to display the turn signal. The process then repeats from step 44. If, however, at 46, the sample RPM is less than the working RPM of the vehicle (i.e., the vehicle is traveling at a higher speed than when the sample reading was taken—the vehicle is completing, or has completed, a turn), the processor deactivates the turn signal at 50.

At any time during operation, the operator may deactivate the auto turn signal deactivator. That is, the operator may prefer to manually deactivate the turn signal. Such deactivation of the auto turn signal deactivator may be accomplished by way of a toggle switch, extended engagement of the turn signal activator, or various other methods.

Thus, embodiments of the present invention provide a system and method of automatically deactivating a turn signal. In particular, certain embodiments of the present invention do not rely on a mechanical trigger to deactivate the turn signal.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for automatically deactivating a turn signal displayed on a vehicle, the system comprising:
   a steering device for steering the vehicle;
   a turn signal activator configured to be engaged to activate a turn signal;
   a turn attribute sensing device including at least one of a velocity sensor configured to detect a velocity of the vehicle, a distance measuring device configured to measure a distance traveled by the vehicle, and a timer; and
   a processing unit in communication with the turn attribute sensing device, wherein said processing unit deactivates the turn signal based on a comparison between a predetermined data point and the vehicle turn attribute.

2. The system of claim 1, wherein said processing unit deactivates the turn signal when the vehicle turn attribute measured by the sensor exceeds the predetermined data point.

3. The system of claim 1, wherein the predetermined data point is representative of a magnitude of velocity that is less than the that when the turn signal is activated, said processing unit deactivating the turn signal after the magnitude of velocity of the vehicle exceeds the predetermined data point subsequent to the magnitude of velocity dropping to a point that is at or below the predetermined data point.

4. The system of claim 1, wherein the predetermined data point is representative of a precalculated time of a normal turn, said processing unit monitoring the turning time after the turn signal is activated, and said processing unit deactivating the turn signal when the turning time exceeds the precalculated time of the normal turn.

5. The system of claim 1, wherein the predetermined data point is representative of a precalculated distance of a normal turn, said processing unit monitoring the turn distance after the turn signal is activated, and said processing unit deactivating the turn signal when the turn distance exceeds the precalculated distance of the normal turn.

6. The system of claim 1, wherein the vehicle is one of an automobile and a motorcycle.

7. The system of claim 1, wherein the steering device is at least one of a steering wheel, handle, lever, joystick, button(s), foot pedals, and stick.

8. The system of claim 1, wherein the turn signal activator is at least one of a button, lever, stick, and switch.

9. The system of claim 1, wherein said turn signal activator is engaged for a first length of time to indicate a full turn and a second length of time to indicate a lesser turn.

10. A system for automatically deactivating a turn signal displayed on a vehicle, the system comprising:
    a sensor configured to measure a vehicle variable; and
    a processing unit in communication with said sensor, wherein said processing unit deactivates the turn signal based on a comparison between the vehicle variable and a predetermined data point referenced by the processing unit.

11. The system of claim 10, wherein said sensor is at least one of a velocity measuring device, a timer, an accelerometer, a positional sensor, and a distance measuring device, and wherein the vehicle variable is at least one of a vehicle speed, time of turn, vehicle acceleration, vehicle position, and a distance traveled.

12. The system of claim 10, wherein said processing unit deactivates the turn signal when the vehicle variable measured by the sensor exceeds the predetermined data point.

13. The system of claim 10, wherein said sensor is a velocity measuring device, and the vehicle variable is vehicle speed.

14. The system of claim 13, wherein the predetermined data point is representative of a speed that is less than the vehicle speed when the turn signal is activated, said processing unit deactivating the turn signal after the vehicle speed exceeds the predetermined data point subsequent to the vehicle speed dropping to a point that is at or below the predetermined data point.

15. The system of claim 10, wherein said sensor is a timer, and the vehicle variable is turning time.

16. The system of claim 15, wherein the predetermined data point is representative of a precalculated time of a normal turn, said processing unit monitoring the turning time after the turn signal is activated, and said processing unit deactivating the turn signal when the turning time exceeds the precalculated time of the normal turn.

17. The system of claim 10, wherein said sensor is a distance measuring device, and the vehicle variable is turn distance.

18. The system of claim 17, wherein the predetermined data point is representative of a precalculated distance of a normal turn, said processing unit monitoring the turn distance after the turn signal is activated, and said processing unit deactivating the turn signal when the turn distance exceeds the precalculated distance of the normal turn.

19. The system of claim 10, further comprising a turn signal activator in communication with said processing unit, said turn signal activator being engaged for a first length of time to indicate a full turn and a second length of time to indicate a lesser turn.

20. The system of claim 10, wherein the vehicle is one of an automobile and a motorcycle.

21. The system of claim 10, further comprising a positional sensor configured to detect the vehicle variable, which is a position of the vehicle, wherein said positional sensor is in communication with the processing unit, and wherein said processing unit deactivates the turn signal based on data received from said positional sensor.

22. The system of claim 21, wherein said positional sensor is at least one of a gyroscope and a compass.

23. The system of claim 21, wherein said positional sensor is part of a global positioning system.

24. A method of automatically deactivating a turn signal displayed on a vehicle, the method comprising:
    activating a turn signal;
    sensing a vehicle attribute;
    comparing the vehicle attribute to a predetermined data point related to the vehicle attribute such that the vehicle attribute and the predetermined data point are measured in a same units; and
    deactivating the turn signal based on said comparing.

25. The method of claim 24, wherein said deactivating occurs when the vehicle attribute exceeds the predetermined data point.

26. The method of claim 24, wherein the vehicle attribute is vehicle speed, the predetermined data point is representative of a speed that is less than the vehicle speed when the turn signal is activated, wherein said deactivating occurs after the vehicle speed exceeds the predetermined data point subsequent to the vehicle speed dropping to a point that is at or below the predetermined data point.

27. The method of claim 24, wherein the vehicle attribute is turning time, and the predetermined data point is representative of a precalculated time of a normal turn, said deactivating occurring when the turning time exceeds the precalculated time of the normal turn.

28. The method of claim 24, wherein the vehicle attribute is turn distance, and the predetermined data point is representative of a precalculated distance of a normal turn, wherein the deactivating occurs when the turn distance exceeds the precalculated distance of the normal turn.

29. The method of claim 24, wherein the vehicle attribute is vehicle heading, and the predetermined data point is representative of a change of direction from a first heading to a second heading, wherein the deactivating occurs when the vehicle heading changes from the first heading to the second heading.

* * * * *